US010735538B2

(12) United States Patent
Gu et al.

(10) Patent No.: US 10,735,538 B2
(45) Date of Patent: Aug. 4, 2020

(54) CONVERSION FROM MASSIVE PULL REQUESTS TO PUSH REQUESTS

(71) Applicant: International Business Machines Corporation, Armonk, NY (US)

(72) Inventors: Yue YG Gu, Beijing (CN); Du Qian, Beijing (CN); Xiao Ning Sun, Beijing (CN); Hui WH Wang, Beijing (CN); Peng Wang, Beijing (CN); Kun Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 15/849,399

(22) Filed: Dec. 20, 2017

(65) Prior Publication Data
US 2019/0191001 A1    Jun. 20, 2019

(51) Int. Cl.
*H04L 29/08* (2006.01)
*G06F 3/06* (2006.01)
*H04L 12/24* (2006.01)

(52) U.S. Cl.
CPC .......... *H04L 67/26* (2013.01); *G06F 3/067* (2013.01); *G06F 3/0611* (2013.01); *G06F 3/0659* (2013.01); *H04L 41/085* (2013.01); *H04L 67/2842* (2013.01)

(58) Field of Classification Search
CPC ... H04L 67/26; H04L 67/2842; H04L 41/085; G06F 3/0611; G06F 3/0659; G06F 3/067
See application file for complete search history.

(56) References Cited

U.S. PATENT DOCUMENTS

| | | | |
|---|---|---|---|
| 7,089,577 B1 | 8/2006 | Rakib et al. | |
| 7,284,035 B2 | 10/2007 | Yu et al. | |
| 7,325,042 B1 | 1/2008 | Soscia et al. | |
| 7,359,955 B2 | 4/2008 | Menon et al. | |
| 7,860,950 B2 | 12/2010 | Menon et al. | |
| 9,357,029 B2 | 5/2016 | George et al. | |
| 10,158,709 B1* | 12/2018 | Muniswamy-Reddy | H04L 67/1097 |
| 2004/0208177 A1* | 10/2004 | Ogawa | H04L 41/0213 370/392 |
| 2008/0059631 A1 | 3/2008 | Bergstrom et al. | |
| 2009/0122699 A1* | 5/2009 | Alperovitch | H04L 45/00 370/230 |
| 2011/0066709 A1 | 3/2011 | Khurana et al. | |

(Continued)

OTHER PUBLICATIONS

Christie, "Intelligent caching improves storage performance, reduces bandwidth," Tech Target, Tulsa, Oklahoma, Oct. 2000, 5 pages.

(Continued)

*Primary Examiner* — Todd L Barker
(74) *Attorney, Agent, or Firm* — VanLeeuwen & VanLeeuwen; Christopher M. Pignato

(57) ABSTRACT

An approach is provided in which a system determines that an amount of times that a set of data was requested by clients from a backend service exceeds a threshold and, in turn, stores the set of data in a local storage area. When the system receives a new request from a client and determines that the new request is requesting the set of data from the backend service, the system retrieves the set of data from the local storage area and provides the retrieved set of data to the client to fulfill the new request.

20 Claims, 9 Drawing Sheets

(56) References Cited

U.S. PATENT DOCUMENTS

| | | | |
|---|---|---|---|
| 2012/0105637 A1* | 5/2012 | Yousefi | B60R 16/0315 348/148 |
| 2012/0278464 A1* | 11/2012 | Lehane | H04L 12/1407 709/223 |
| 2013/0204961 A1* | 8/2013 | Fliam | G06F 3/0685 709/214 |
| 2014/0025630 A1* | 1/2014 | Takase | H04L 67/1097 707/609 |
| 2014/0297844 A1* | 10/2014 | Kancherla | H04L 43/0894 709/224 |
| 2015/0222681 A1* | 8/2015 | Basile | H04L 65/60 709/219 |
| 2016/0352412 A1* | 12/2016 | Di Costanzo | G06F 8/65 |
| 2017/0118302 A1 | 4/2017 | Cuduvalli Ravikanth Rao et al. | |
| 2018/0261020 A1* | 9/2018 | Petousis | G07C 5/008 |

OTHER PUBLICATIONS

"How to Optimize the Performance of a Web Application by Using Output Caching?" The Official 360logica Blog, Sep. 2016, 4 pages.

* cited by examiner

| Managed Requests List 900 |||||
|---|---|---|---|---|
| Requested Data Identifier | # Current Requests (/min) | Request # Threshold (/min) | Data Check Interval (/min) | Last Cache Data Update |
| Data ID A | 40 | 60 | 60 | -- |
| Data ID B | 5 | 30 | 30 | 2:30 |
| Data ID C | 18 | 15 | 15 | :18 |
| ... | | | | |

CONVERSION FROM MASSIVE PULL REQUESTS TO PUSH REQUESTS

BACKGROUND

At times, backend services may become overloaded with client requests, especially during significant events such as large stock market swings, large sales on airline flights. etc. During these times, clients are sending multiple requests to a backend server to try to receive the latest updates in data. Many times, however, the actual backend data does not change in the timespan that the multiple requests are sent. Even though the data may not change, each request is sent to the backend service for the backend service to process, tying up both backend service resources and network resources.

BRIEF SUMMARY

According to one embodiment of the present disclosure, an approach is provided in which a system determines that an amount of times that a set of data was requested by clients from a backend service exceeds a threshold and, in turn, stores the set of data in a local storage area. When the system receives a new request from a client and determines that the new request is requesting the set of data from the backend service, the system retrieves the set of data from the local storage area and provides the retrieved set of data to the client to fulfill the new request.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) storing a set of data in a local storage area in response to determining that an amount of times that the set of data was requested from a backend service exceeds a threshold, wherein the backend service stores the set of data in a backend storage area; (ii) receiving a new request from a client that is requesting the set of data from the backend service; (iii) in response to determining that the new request is requesting the set of data from the backend service: (iv) retrieving the set of data from the local storage area; and (v) providing the set of data retrieved from the local storage area to the client to fulfill the new request.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 9 is an exemplary diagram depicting a managed requests list.

DETAILED DESCRIPTION

Figure 1:
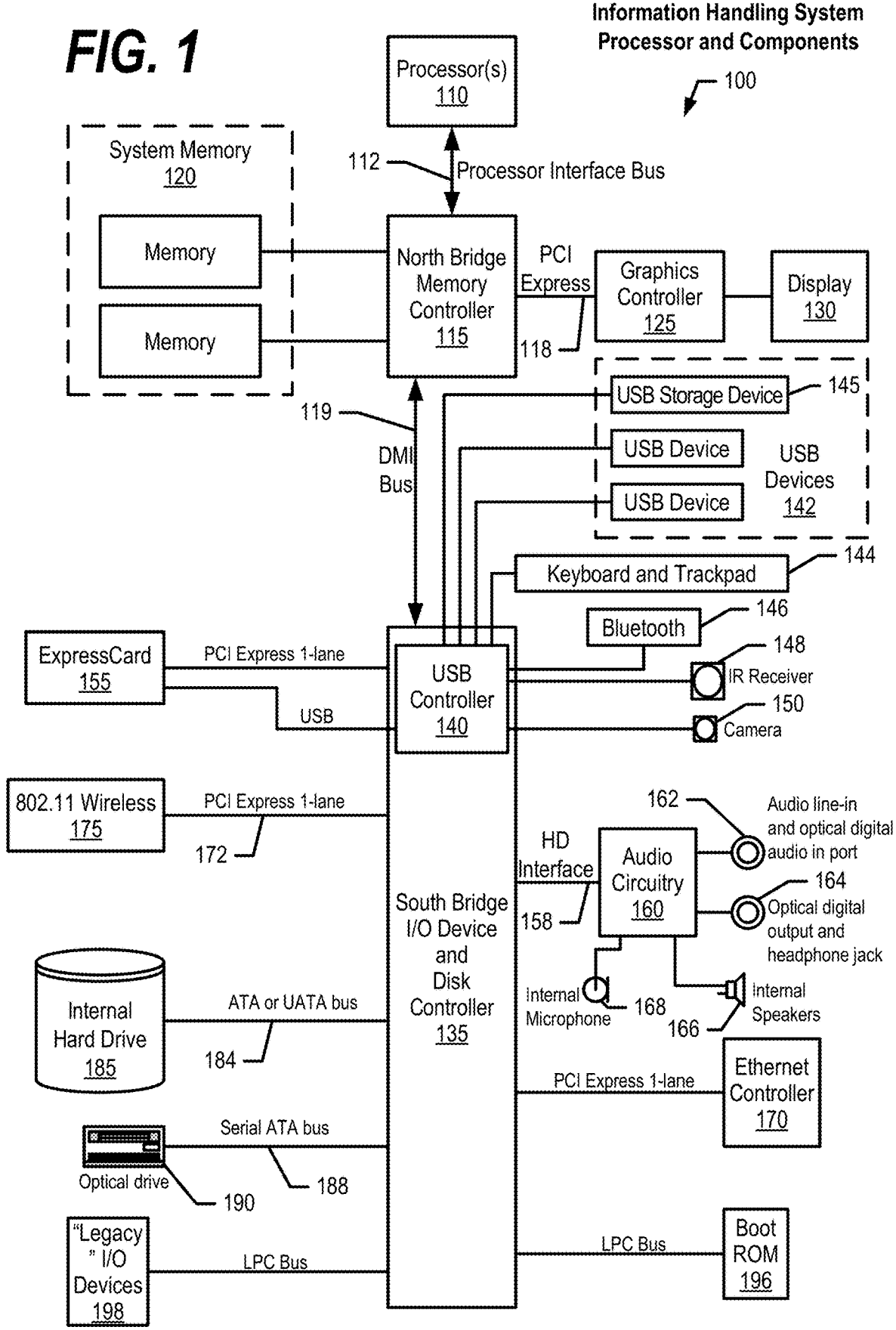
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor. Northbridge 115 and Southbridge 135 connect to each other using bus 119.

In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/

Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
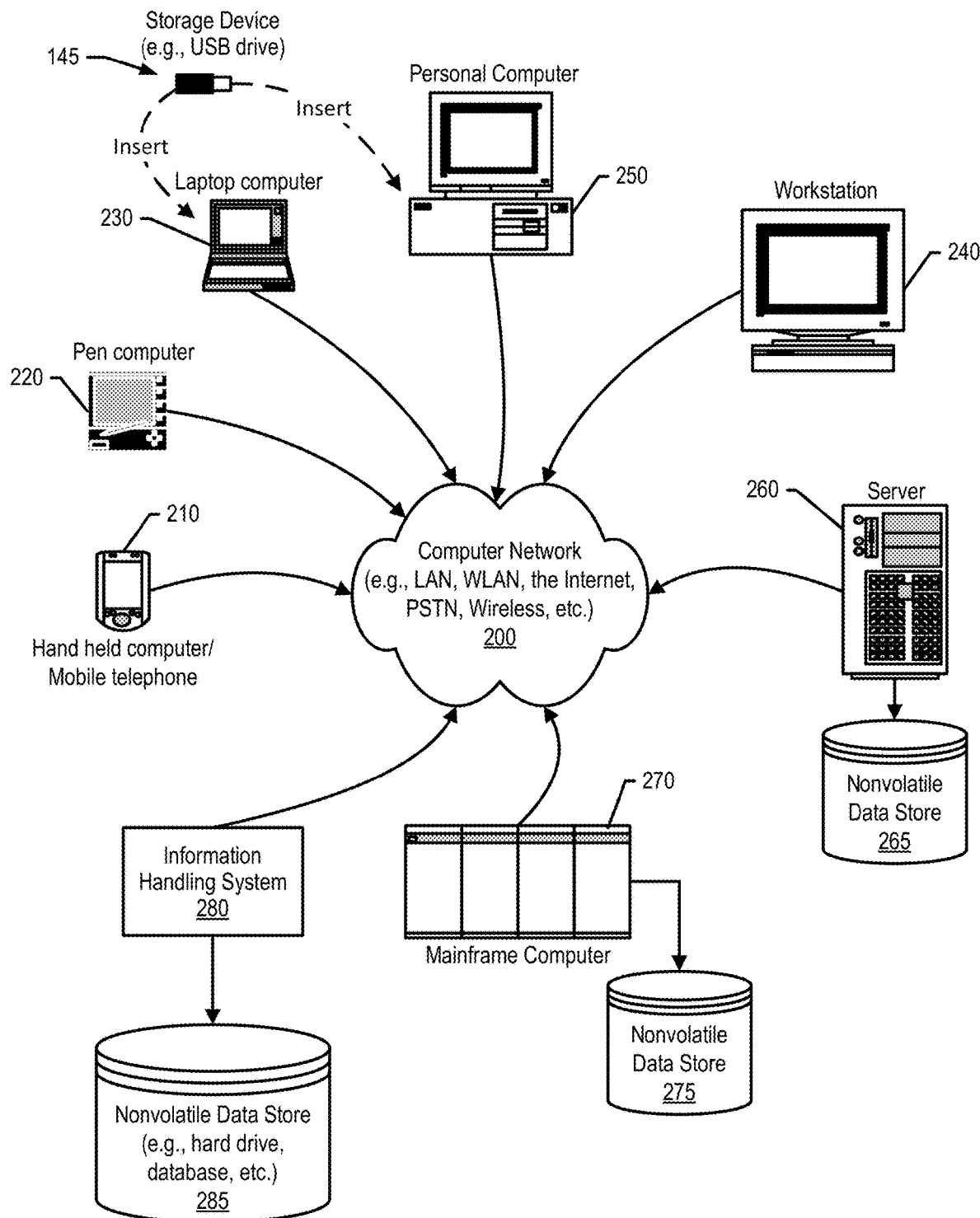
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 9 depict an approach that can be executed on an information handling system. The information handling system acts as an intermediary between clients and backend services to reduce the amount of duplicate requests sent from the clients to the backend services by storing recent versions of data in local cache. The information handling system ensures that the cached data is recent by interacting with worker modules installed on the backend services that monitor data changes and pushes the updated data to the information handling system accordingly. In turn, a client receives the latest data from the information handling system without the information handling system having to request the data from the backend service. As such, the client receives the data quicker, the bandwidth usage greatly decreases between the information handling system and backend service, and the backend service's overall performance improves by removing repeated duplicate client requests from its queue. As discussed herein, a pull request is a request from a client that is requesting data from a server (pulling data from the backend server), and a push request is initiated by the backend server that "pushes" data to other entities without receiving requests from the other entities. Also as discussed herein, a duplicate client request is a request for the same backend data and may be initiated by the same client or multiple clients. Duplicatively requested backend data may be determined by matching target locations of the client requests.

Figure 3:
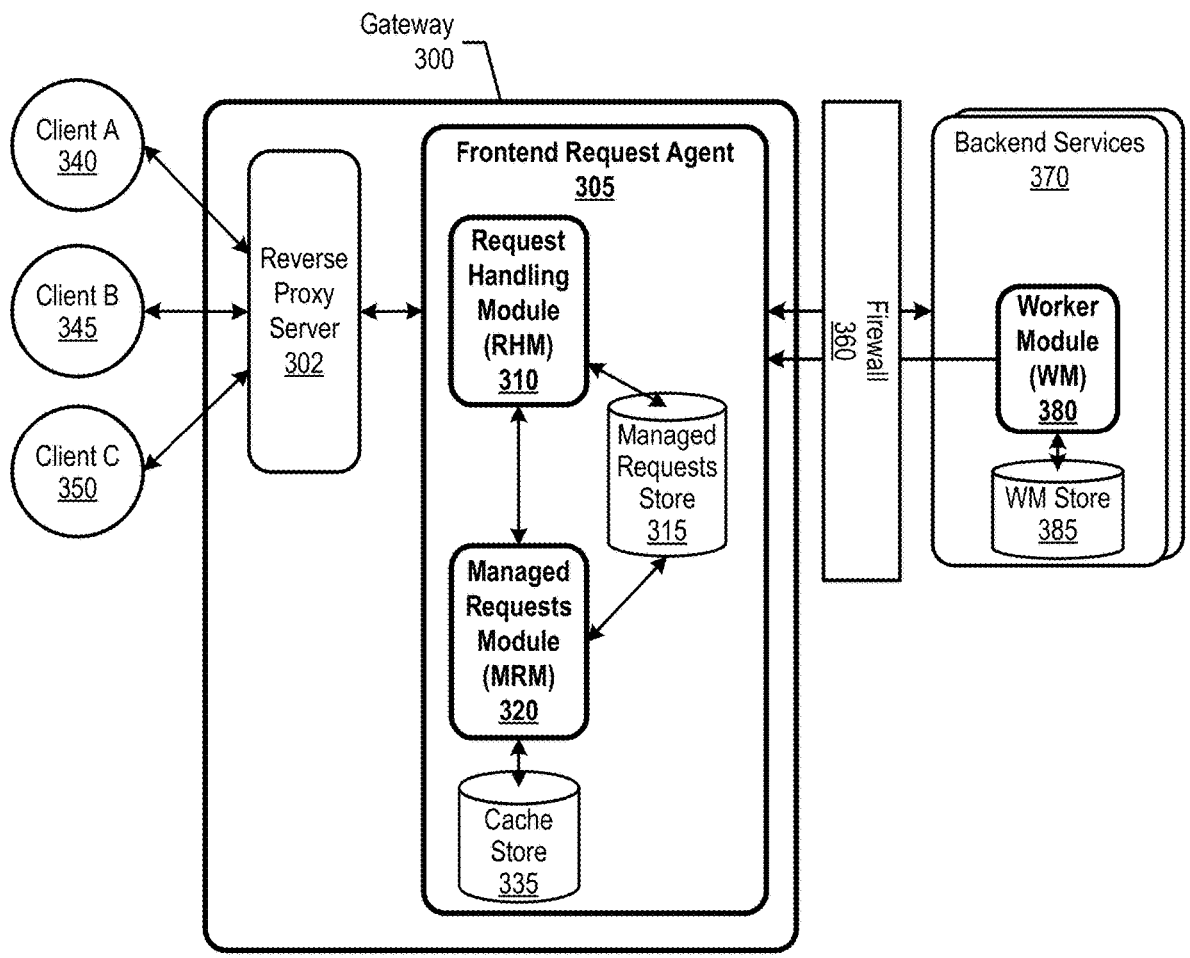
FIG. 3 is an exemplary diagram depicting an approach of fulfilling repeated duplicate client requests without taxing a backend service.

FIG. 3 is an exemplary diagram depicting an approach of fulfilling repeated duplicate client requests without taxing a backend service with massive pull requests. Gateway 300 receives requests from clients A 340, B 345, and C 350 for data managed by backend services 370. Gateway 300 includes reverse proxy server 305 that performs typical tasks such as retrieving resources/data on behalf of a client from one or more servers.

Gateway 300 also includes frontend request agent 305, which includes request handling module 310 and managed requests module 320. Request handling module 310 intercepts client requests and checks whether the client requests are under managed. For example, request handling module 310 may receive duplicate client requests at a rate of 60 requests per minute (from one client or multiple clients). In this example, request handling module 310 may work in conjunction with managed request module 320 to determine that the request should be managed by frontend request agent 305 because the duplicate request rate exceeds a threshold as discussed in further detail herein.

Figure 7:
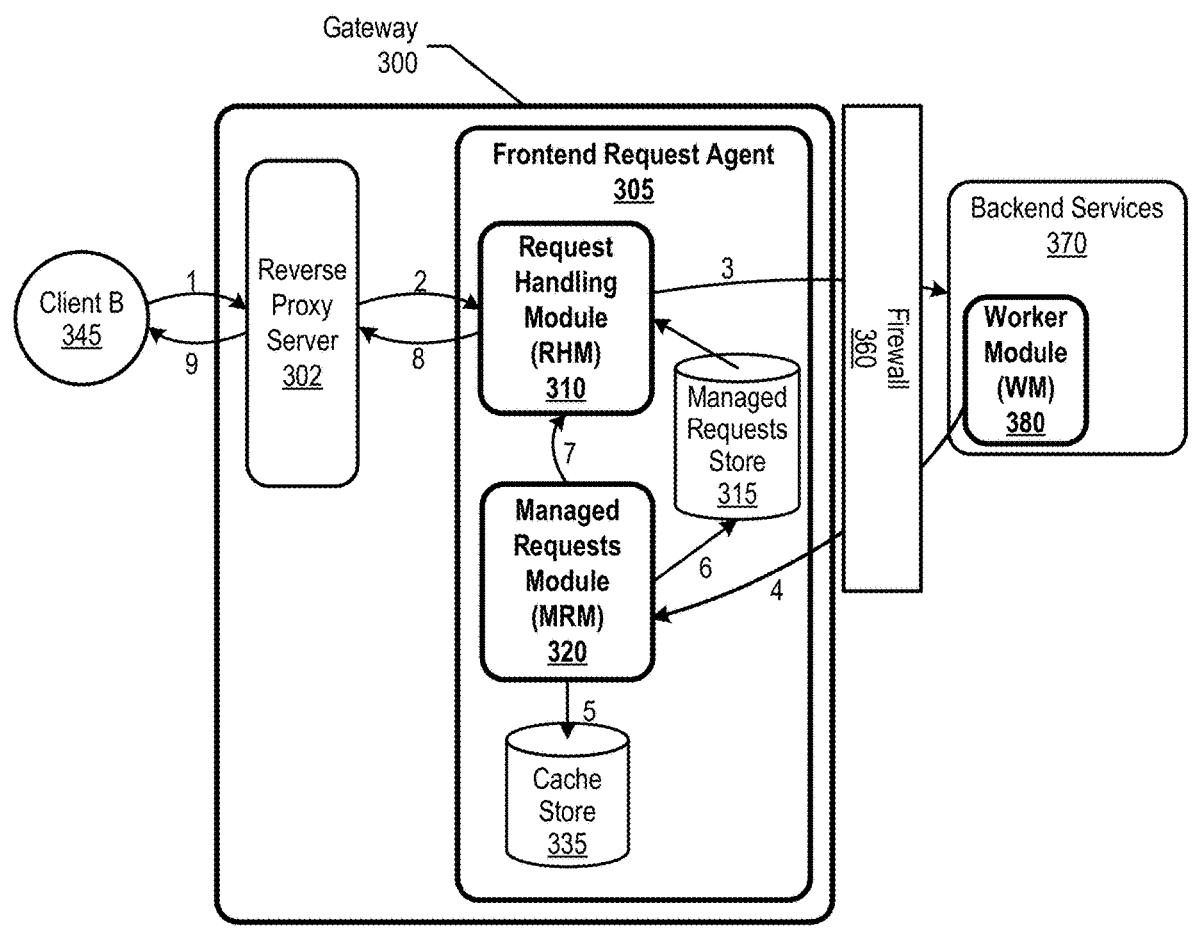
FIG. 7 is an exemplary diagram depicting a frontend request agent receiving a managed request for a first time during a session.

When request handling module 310 intercepts a client request that is currently not a managed request, frontend request agent 305 sends the request to backend service through firewall 360 to retrieve the backend data (see FIG. 7 and corresponding text for further details). When request handling module 310 intercepts a request that is a managed request, frontend request agent 305 retrieves the cached backend data from cache store 335 to fulfill the client request (see FIG. 8 and corresponding text for further details).

Managed request module 320 analyzes requests based on request management policies and manages the caching of data in cache store 335 received from backed services 370. Managed request module 320 determines which requests should be managed and when the request should be managed according to the request management policies that define threshold frequencies (thresholds) of the requests. Once a request is identified as a managed request, managed request module 320 adds the client request to a managed request entry in managed requests store 315 (see FIG. 5 and corresponding text for further details).

Worker module 380 is installed on each backend service 370 to monitor changes in backend data. Worker module 380 receives a list of managed requests from frontend request agent 305 and stores the list locally in worker module store 385. Worker module 380 recursively executes the managed requests based on predefined time intervals to determine whether the backend data has changed at backend services 370 (see FIG. 6 and corresponding text for further details). If there are no changes to the data, in one embodiment, worker module 380 may send a small sized status update to frontend request agent 305 just to inform frontend request agent 305 that worker module 380 is alive (that is, active).

Figure 4:
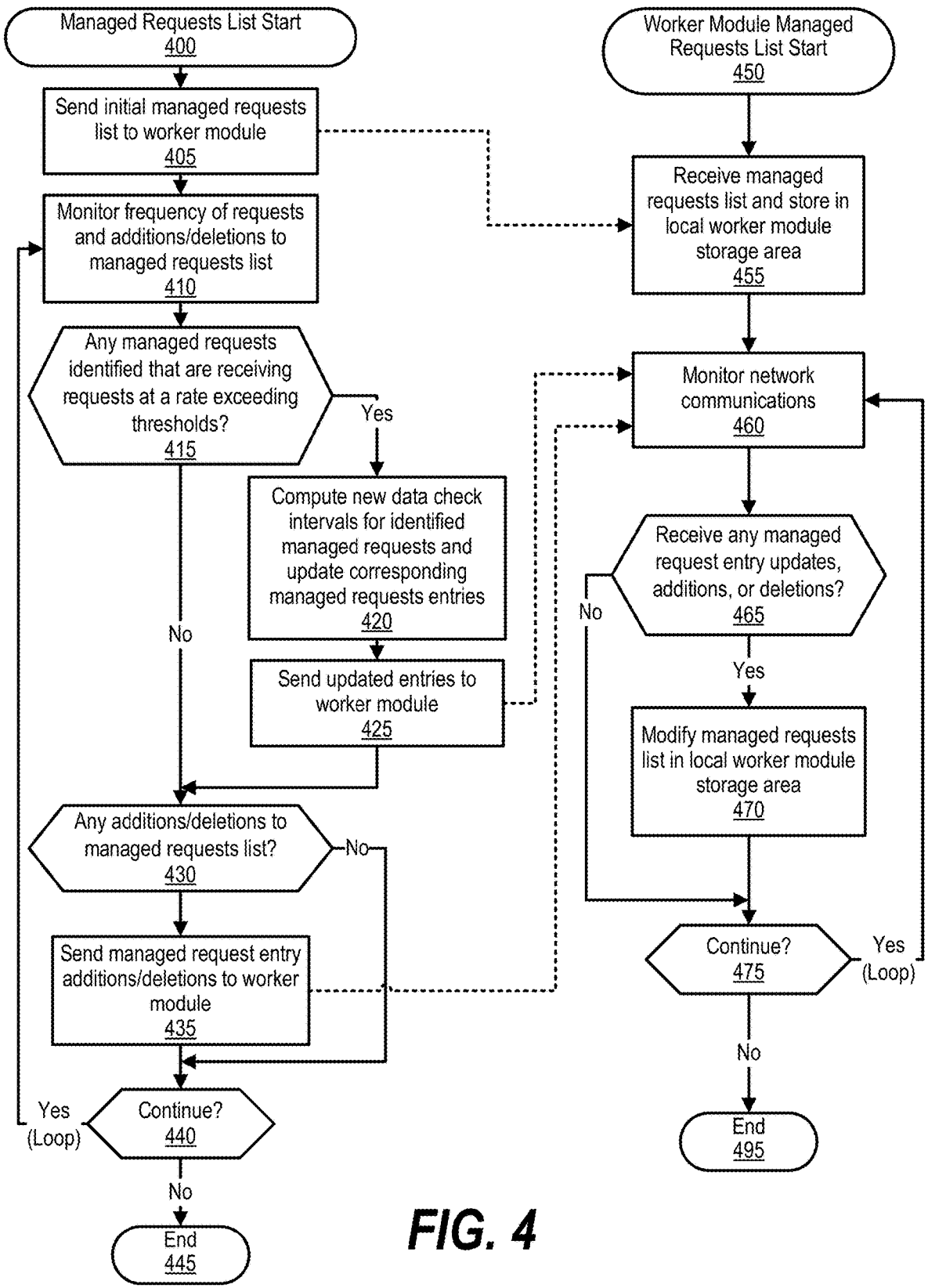
FIG. 4 is an exemplary flowchart showing steps taken by a frontend request agent and remote worker module to maintain a managed requests list.

FIG. 4 is an exemplary flowchart showing steps taken by a frontend request agent and remote worker module to maintain a managed requests list. Frontend request agent processing commences at 400 whereupon, at step 405, frontend request agent 305 sends an initial managed requests list, stored in managed requests store 315, to worker module 380 (see FIG. 9 and corresponding text for further details). In one embodiment, the initial managed requests list may be based on previously known high access rate requests. Worker module processing commences at 450 whereupon, at step 455, worker module 380 receives the managed requests list and stores the managed requests list in a local worker module storage area (worker module store 385). At step 460, worker module 380 monitors network communications from frontend request agent 305 as discussed below.

Figure 5:
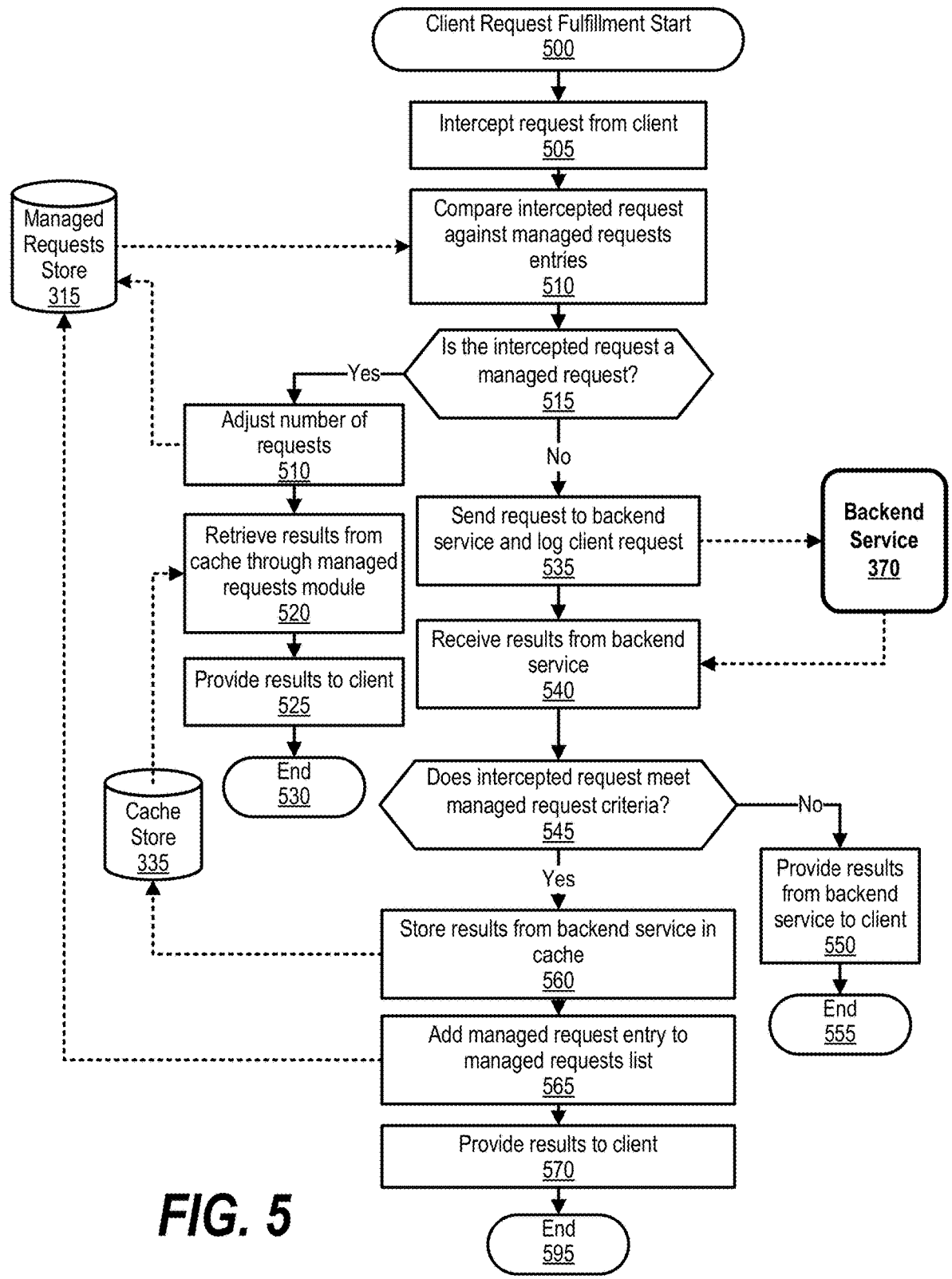
FIG. 5 is an exemplary flowchart showing steps taken by a frontend request agent to process incoming client requests.

Referring back to frontend request agent processing, at step 410, frontend request agent 305 monitors the frequency of client requests as well as additions/deletions to the managed requests list during request processing (see FIG. 5 and corresponding text for further details). Frontend request agent 305 determines as to whether any existing managed requests were identified that are receiving duplicate requests at a rate exceeding their current threshold (decision 415). If there are not any managed requests receiving corresponding requests at a rate exceeding their threshold, then decision 415 branches to the 'no' branch. On the other hand, if any of the existing managed requests are receiving requests at a rate exceeding their corresponding threshold, then decision 415 branches to the 'yes' branch whereupon, at step 420, frontend request agent 305 computes new data check intervals for the identified managed requests and updates their corresponding managed requests entries locally in managed requests store 315. At step 425, frontend request agent 305 sends the updated managed request entries to worker module 380.

Frontend request agent 305 determines as to whether there are any additions/deletions to the managed requests list, such as from step 565 in FIG. 5 (decision 430). If there are not any additions/deletions to the managed requests list, then decision 430 branches to the 'no' branch. On the other hand, if there are additions/deletions to the managed requests list, then decision 430 branches to the 'yes' branch whereupon, at step 435, frontend request agent 305 sends the managed request entry additions/deletions to worker module 380. Frontend request agent 305 determines as to whether to continue (decision 440). If frontend request agent 305 processing should continue, then decision 440 branches to the 'yes' branch which loops back to continue monitoring client requests. This looping continues until frontend request agent 305 processing should terminate, at which point decision 440 branches to the 'no' branch exiting the loop. Frontend request agent processing thereafter ends at 445.

Referring to worker module 380 processing, worker module 380 monitors communications from frontend request agent 305 at step 460, and determines as to whether worker module 380 received any managed request entry updates, additions, or deletions (decision 465). If worker module 380 did not receive any managed request entry updates, additions, or deletions, then decision 465 branches to the 'no' branch. On the other hand, if worker module 380 received any managed request entry updates, additions, or deletions, then decision 465 branches to the 'yes' branch whereupon, at step 470, worker module 380 modifies the managed requests list in the local worker module storage area (worker module store 385).

Worker module 380 then determines as to whether to continue (decision 475). If worker module 380 should continue, then decision 475 branches to the 'yes' branch which loops back to monitor gateway communications. This looping continues until worker module 380 processing should terminate, at which point decision 475 branches to the 'no' branch exiting the loop. Worker module processing thereafter ends at 495.

FIG. 5 is an exemplary flowchart showing steps taken by frontend request agent 305 to process incoming client requests. Frontend request agent 305 processing commences at 500 whereupon, at step 505, frontend request agent 305 intercepts a request from client. At step 510, frontend request agent 305 compares the intercepted request against managed requests entries stored in managed requests store 315. Frontend request agent 305 determines as to whether the intercepted request matches a managed request entry (decision 515).

If the intercepted request matches a managed request entry, then decision 515 branches to the 'yes' branch to fulfill the request using locally cached data. At step 510, frontend request agent 305 first increments the number of requests of the matched managed request entry. At step 520, frontend request agent 305 retrieves the cached backend data from cache store 335. And, at step 525, frontend request agent 305 provides the retrieved backend data to the client and frontend request agent 305 processing thereafter ends at 530. As a result of retrieving the backend data from cache store 335, frontend request agent 305 does not tie up bandwidth by sending requests to, and receiving results from, backend services 370.

Referring back to decision 515, if the intercepted request does not match one of the managed request entries, then decision 515 branches to the 'no' branch. At step 535, frontend request agent 305 sends the request to backend service 370 and logs the client request. Frontend request agent 305 logs the client request, particularly the corresponding requested data, so frontend request agent 305 is able to determine times at which the amount of duplicate client requests exceed a threshold (discussed below).

At step 540, frontend request agent 305 receives results from backend service 370. Frontend request agent 305 determines as to whether the intercepted request meets managed request criteria based on, in one embodiment, comparing the amount of logged duplicate client requests to predefined policies (decision 545).

If the intercepted request does not meet the criteria to be a managed request, then then decision 545 branches to the 'no' branch. At step 550, frontend request agent 305 provides the results from backend service 370 to the client and frontend request agent 305 processing thereafter ends at 555.

Referring back to decision 545, if the intercepted request meets the criteria for becoming a managed request, then decision 545 branches to the 'yes' branch whereupon, at step 560, frontend request agent 305 stores the results from backend service 370 into local cache store 335. At step 565, frontend request agent 305 creates a managed request entry for the intercepted request and adds the entry to the managed requests list. In one embodiment, frontend request agent 305 flags the newly added entry so frontend request agent 305 sends the new entry to worker module 380 (see FIG. 4 and corresponding text for further details). At step 570, frontend request agent 305 provides the results to client and frontend request agent 305 processing thereafter ends at 595.

Figure 6:
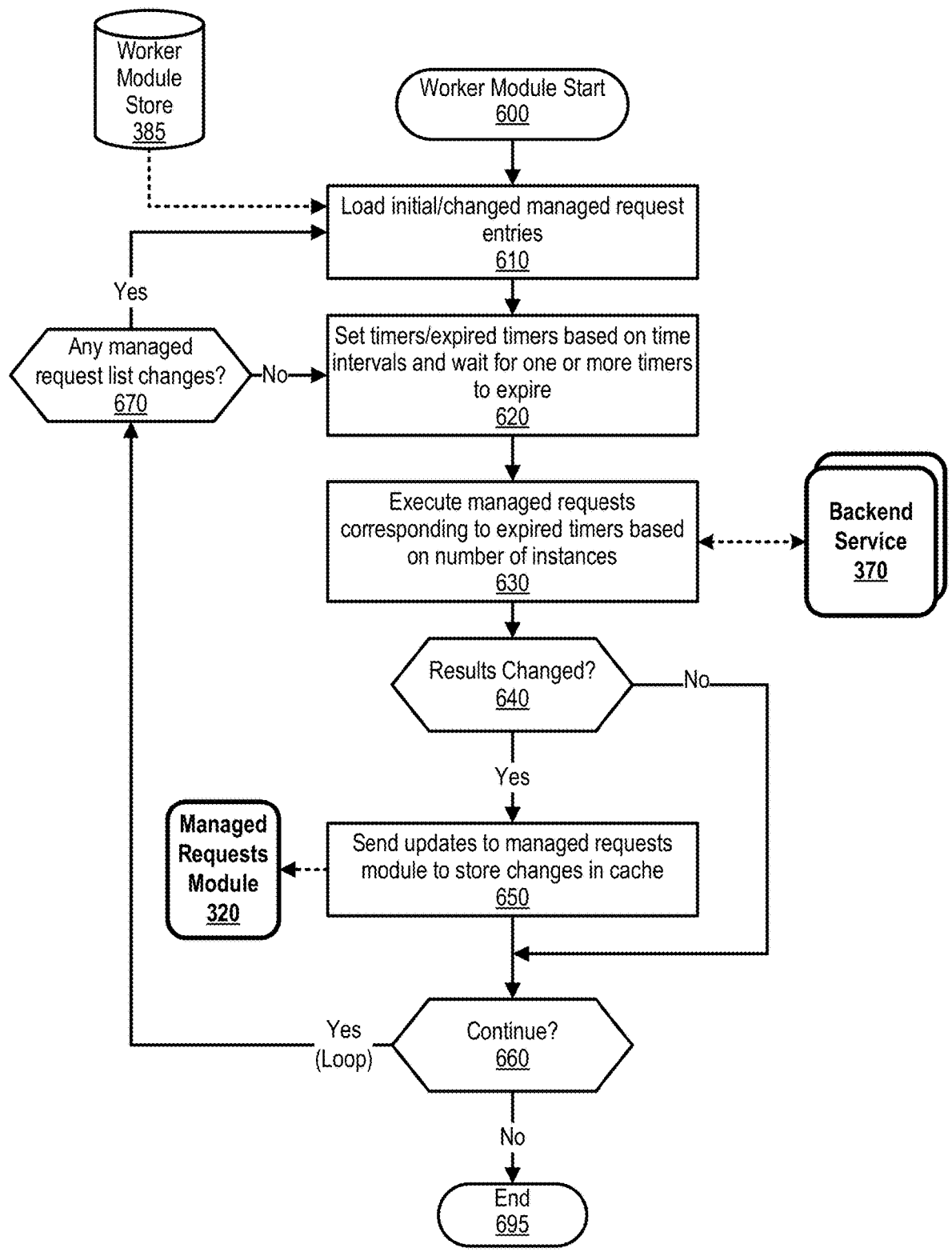
FIG. 6 is an exemplary flowchart showing steps taken by the worker module to check for changes in data at the backend services.

FIG. 6 is an exemplary flowchart showing steps taken by the worker module to check for changes in data at the backend services. FIG. 6 processing commences at 600 whereupon, at step 610, worker module 380 loads the initial managed request entries received from frontend request agent 305. At step 620, worker module 380 extracts data check intervals from the managed request entries and sets timers based on the data check intervals (see FIG. 9 and corresponding text for further details). Worker module 380 then waits for one or more of the timers to expire.

When one of the timers expires, worker module 380, at step 630, executes the corresponding managed requests on backend services 370 and retrieves backend data. In one embodiment, the frequency at which a particular worker module 380 executes is based on the number of instances of a particular backend service 370. For example, if two instances of a backend service 370 are executing, a worker module 380 corresponding to each instance may "ping pong" its execution of the managed request when the managed request's corresponding timer expires.

Worker module 380 determines as to whether the backend data changed from the previous execution of the request (decision 640). If the backend data did not change, then decision 640 branches to the 'no' branch and, in one embodiment, worker module 380 does not send an update to frontend request agent 305. In another embodiment, worker module 380 may send a short message to frontend request agent 305 that informs frontend request agent 305 that no changes were made to the backend data.

On the other hand, if the backend data results did change, then decision 640 branches to the 'yes' branch whereupon, at step 650, worker module 380 sends the updates to frontend request agent 305 to store in cache store 335 (see FIG. 5 and corresponding text for further details). Frontend request agent 305, in one embodiment, updates the managed request's corresponding managed request entry to indicate that it received backend data from worker module 380 (see FIG. 9 and corresponding text for further details).

Worker module 380 determines as to whether to continue processing (decision 660). If worker module 380 processing should continue, then decision 660 branches to the 'yes' branch, whereupon worker module 380 determines as to whether any managed request list changes occurred (from steps take in FIG. 4) (decision 670). If there are any managed request list changes (new data check intervals, new managed request entries, etc.), then decision 670 branches to the 'yes' branch whereupon worker module 380 loads the updated managed request entries, such as new entries or entries with updated data check intervals. On the other hand, if there were not any managed request list changes, then decision 670 branches to the 'no' branch whereupon worker module 380 continues to monitor timers that have not yet expired and/or reset those timers that have expired. When worker module 380 processing should terminate, decision 660 branches to the 'no' branch whereupon worker module 380 processing thereafter ends at 695.

FIG. 7 is an exemplary diagram depicting frontend request agent 305 receiving a managed request for a first time during a session. Client B 345 sends a request (1), whereupon reverse proxy servicer 302 forwards the request to request handling module 310 (2). Request handling module 310 and/or managed request module 320 determine that there is not a current set of backend data in cache store 335 based on the request's managed request entry (see FIG. 9 and corresponding text for further details). In turn, request handling module 310 forwards the request to backend services 370 to receive a current set of backend data (3). Worker module 380 intercepts the request and executes the request to backend services 380. Worker module 380, in turn, provides the backend data results to managed request module 320 (4).

Managed request module 320 stores the backend data in cache store 335 (5) and sends the backend data to request handling module 310 (7). Request handling module 310 then sends the backend data to client B through reverse proxy server 302 (8, 9). Now that cache store 335 includes current data, frontend request agent 305 can fulfill subsequent duplicate requests without sending requests to backend services 370 (see FIG. 8 and corresponding text for further details).

Figure 8:
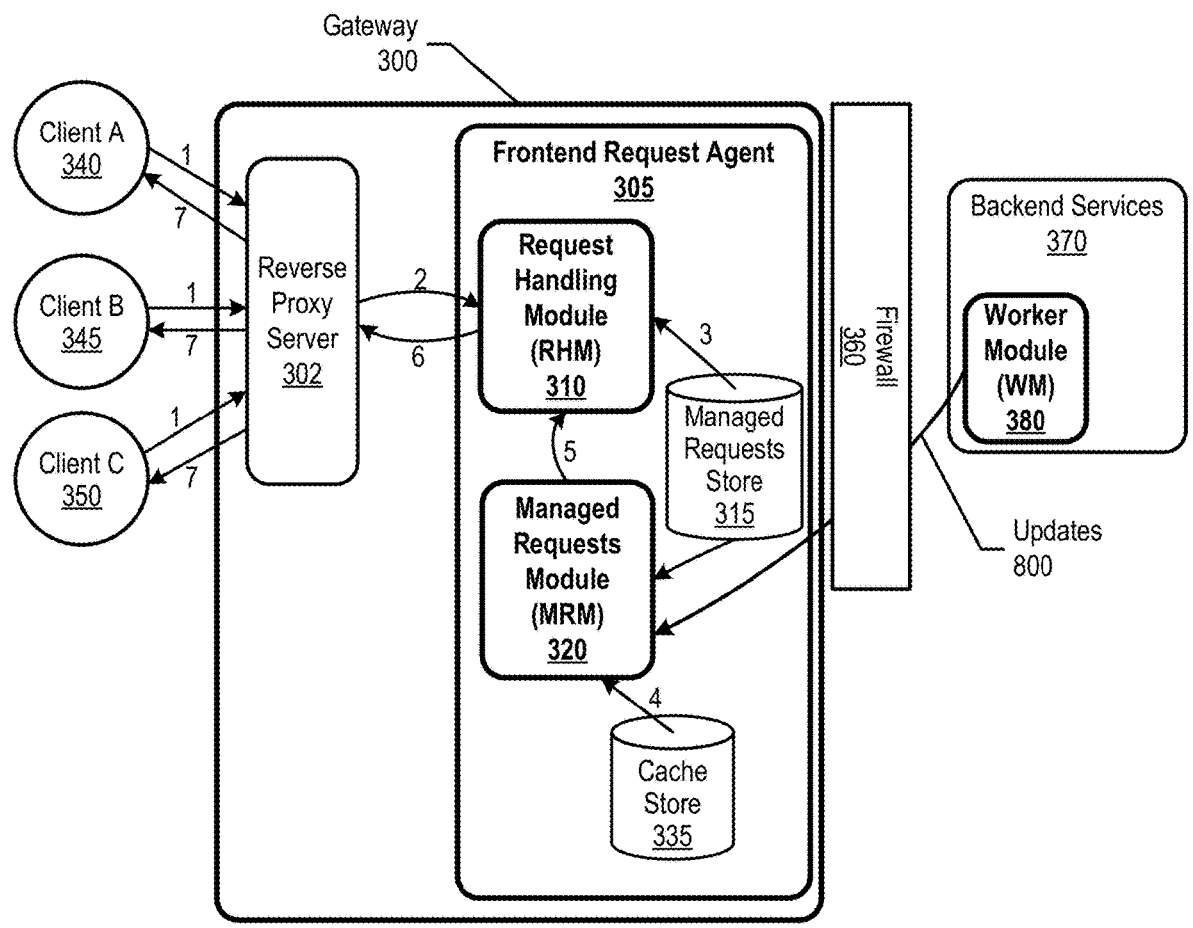
FIG. 8 is an exemplary diagram depicting a frontend request agent fulfilling duplicate client requests without taxing backend services.

FIG. 8 is an exemplary diagram depicting frontend request agent 305 fulfilling duplicate client requests without taxing backend services 370 (1). Clients A 340, B 345, and C 350 each send client requests that are duplicates. For example, the stock market may be crashing and each client is requesting information from the same backend service about the Dow index. Reverse proxy servicer 302 forwards each of the client requests to request handling module 310 (2).

Request handling module 310 determines that the client request is a managed request (3) and cache store 335 includes a current set of backend data via the requests managed request entry in managed request store 315. As such, managed request module 320 retrieves the backend data from cache store 335 (4) and forwards the backend data to request handling module 310 320 (5). Request handling module 310 sends the backend data to reverse proxy server 302 (6), which distributes the backend data to the clients (7). During operation, as discussed herein, worker module 380 provides backend data updates 800 to managed request module 320, which stores the updates in cache store 335. Therefore, at any given moment, frontend request agent 305 provides current backend data to a managed request without sending the request to backend services 370.

FIG. 9 is an exemplary diagram depicting a managed requests list. Managed requests lists 900 is stored and utilized by frontend request agent 305 and worker module 380 to manage managed client requests. Column 910 includes a list of data identifiers of client requests. For example, in one embodiment, the data identifiers point to a location of the requested data, or point to a service responsible for the specific requested data. As such, frontend request agent 305 can match duplicate client requests received from different clients over different networks regardless of the sending information in the requests' headers.

Column 920 includes a rolling number of current requests based on a timeframe. This information is used by frontend request agent 305 in combination with threshold information in column 930 to determine when the data check interval of a managed request should be increased. For example, frontend request agent 305 has logged 18 requests for data ID C. Data ID C's request number threshold is 15 because that is the frequency that worker module 380 checks for changes in the backend data (column 940). As such, frontend request agent 305 may increase the data check interval of data ID C (see FIG. 4 and corresponding text for further details).

In one embodiment, managed requests list 900 also includes column 950, which includes information pertaining to the last time that the frontend request agent 305's local cache was updated. Column 950 shows that data ID A has not received new data for an extended period and, therefore frontend request agent 305 will send a request to the backend service on the next client request (see FIG. 7 and corresponding text for further details). As those skilled in the art can appreciate, more or less information may be stored in managed requests list 900 than what is shown in FIG. 9.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   storing a set of data in a local storage area in response to determining that an amount of times that the set of data was requested from a backend service exceeds a threshold, wherein the backend service stores the set of data in a backend storage area;
   creating a managed request entry in response to determining that the amount of times that the set of data was requested from the backend service exceeds the threshold;
   computing a data check interval based on the amount of times that the set of data was requested;
   sending the data check interval to a remote worker module installed in the backend services, wherein the remote worker module is adapted to check the set of data stored at the backend storage area for updates at a rate corresponding to the data check interval;
   receiving an updated set of data from the remote worker module in response to determining that the set of data stored at the backend storage area has changed while checking the set of data at the data check interval;
   receiving a new request from a client that is requesting the set of data from the backend service;
   comparing the new request against a set of managed request entries that comprises the managed request entry; and
   in response to determining that the new request matches at least one of the set of managed request entries:
      retrieving the updated set of data from the local storage area; and
      providing the updated set of data retrieved from the local storage area to the client to fulfill the new request.

2. The method of claim 1 wherein, prior to receiving the new request, the method further comprises:
   wherein the managed request entry comprises a data identifier corresponding to the backend storage area; and
   storing the data check interval in the managed request entry.

3. The method of claim 2 further comprising:
   sending the managed request entry to a remote worker module executing on the backend service.

4. The method of claim 3 further comprising:
   storing the updated set of data in the local storage area.

5. The method of claim 4 further comprising:
   receiving a different request from the client that is requesting the set of data from the backend service; and
   in response to determining that the different request is requesting the set of data from the backend service:
      retrieving the updated set of data from the local storage area; and providing the updated set of data retrieved from the local storage area to the client to fulfill the different request.

6. The method of claim 3 further comprising:
    detecting that the amount of times that the set of data is being requested has increased;
    computing a new data check interval based on the increased amount of times that the set of data is being requested; and
    sending the new data check interval to the remote worker module executing on the backend service.

7. The method of claim 1 wherein, prior to storing the set of data, the method further comprises:
    receiving, from a first client, a set of first requests requesting the set of data from the backend service;
    receiving, from a second client, a set of second requests requesting the set of data from the backend service; and
    determining that an amount of the set of the first requests in combination with an amount of the set of second requests exceeds the threshold.

8. An information handling system comprising:
    one or more processors;
    a memory coupled to at least one of the processors;
    a set of computer program instructions stored in the memory and executed by at least one of the processors in order to perform actions of:
        storing a set of data in a local storage area in response to determining that an amount of times that the set of data was requested from a backend service exceeds a threshold, wherein the backend service stores the set of data in a backend storage area;
        creating a managed request entry in response to determining that the amount of times that the set of data was requested from the backend service exceeds the threshold;
        computing a data check interval based on the amount of times that the set of data was requested;
        sending the data check interval to a remote worker module installed in the backend services, wherein the remote worker module is adapted to check the set of data stored at the backend storage area for updates at a rate corresponding to the data check interval;
        receiving an updated set of data from the remote worker module in response to determining that the set of data stored at the backend storage area has changed while checking the set of data at the data check interval;
        receiving a new request from a client that is requesting the set of data from the backend service;
        comparing the new request against a set of managed request entries that comprises the managed request entry; and
        in response to determining that the new request matches at least one of the set of managed request entries:
            retrieving the updated set of data from the local storage area; and
            providing the updated set of data retrieved from the local storage area to the client to fulfill the new request.

9. The information handling system of claim 8 wherein, prior to receiving the new request, the processors perform additional actions comprising:
    wherein the managed request entry comprises a data identifier corresponding to the backend storage area; and
    storing the data check interval in the managed request entry.

10. The information handling system of claim 9 wherein the processors perform additional actions comprising:
    sending the managed request entry to a remote worker module executing on the backend service.

11. The information handling system of claim 10 wherein the processors perform additional actions comprising:
    storing the updated set of data in the local storage area.

12. The information handling system of claim 11 wherein the processors perform additional actions comprising:
    receiving a different request from the client that is requesting the set of data from the backend service; and
    in response to determining that the different request is requesting the set of data from the backend service:
        retrieving the updated set of data from the local storage area; and
        providing the updated set of data retrieved from the local storage area to the client to fulfill the different request.

13. The information handling system of claim 10 wherein the processors perform additional actions comprising:
    detecting that the amount of times that the set of data is being requested has increased;
    computing a new data check interval based on the increased amount of times that the set of data is being requested; and
    sending the new data check interval to the remote worker module executing on the backend service.

14. The information handling system of claim 8 wherein, prior to storing the set of data, the processors perform additional actions comprising:
    receiving, from a first client, a set of first requests requesting the set of data from the backend service;
    receiving, from a second client, a set of second requests requesting the set of data from the backend service; and
    determining that an amount of the set of the first requests in combination with an amount of the set of second requests exceeds the threshold.

15. A computer program product stored in a computer readable storage medium, comprising computer program code that, when executed by an information handling system, causes the information handling system to perform actions comprising:
    storing a set of data in a local storage area in response to determining that an amount of times that the set of data was requested from a backend service exceeds a threshold, wherein the backend service stores the set of data in a backend storage area;
    creating a managed request entry in response to determining that the amount of times that the set of data was requested from the backend service exceeds the threshold;
    computing a data check interval based on the amount of times that the set of data was requested;
    sending the data check interval to a remote worker module installed in the backend services, wherein the remote worker module is adapted to check the set of data stored at the backend storage area for updates at a rate corresponding to the data check interval;
    receiving an updated set of data from the remote worker module in response to determining that the set of data stored at the backend storage area has changed while checking the set of data at the data check interval;
    receiving a new request from a client that is requesting the set of data from the backend service;

comparing the new request against a set of managed request entries that comprises the managed request entry; and in response to determining that the new request matches at least one of the set of managed request entries:

retrieving the updated set of data from the local storage area; and providing the updated set of data retrieved from the local storage area to the client to fulfill the new request.

16. The computer program product of claim 15 wherein, prior to receiving the new request, the information handling system performs further actions comprising:

wherein the managed request entry comprises a data identifier corresponding to the backend storage area; and storing the data check interval in the managed request entry.

17. The computer program product of claim 16 wherein the information handling system performs further actions comprising:

sending the managed request entry to a remote worker module executing on the backend service.

18. The computer program product of claim 17 wherein the information handling system performs further actions comprising:

storing the updated set of data in the local storage area.

19. The computer program product of claim 18 wherein the information handling system performs further actions comprising:

receiving a different request from the client that is requesting the set of data from the backend service; and in response to determining that the different request is requesting the set of data from the backend service:

retrieving the updated set of data from the local storage area; and providing the updated set of data retrieved from the local storage area to the client to fulfill the different request.

20. The computer program product of claim 17 wherein the information handling system performs further actions comprising:

detecting that the amount of times that the set of data is being requested has increased;

computing a new data check interval based on the increased amount of times that the set of data is being requested; and sending the new data check interval to the remote worker module executing on the backend service.

\* \* \* \* \*